(12) United States Patent
Rabb

(10) Patent No.: US 10,165,401 B2
(45) Date of Patent: *Dec. 25, 2018

(54) ADJUSTING SECURITY IN RESPONSE TO ALERT COMMUNICATIONS

(71) Applicant: Google LLC, Mountain View, CA (US)

(72) Inventor: Laura Rabb, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,154

(22) Filed: Oct. 19, 2017

(65) Prior Publication Data

US 2018/0041865 A1 Feb. 8, 2018

Related U.S. Application Data

(63) Continuation of application No. 14/934,881, filed on Nov. 6, 2015, now Pat. No. 9,826,352.

(51) Int. Cl.
| | |
|---|---|
| *H04W 4/021* | (2018.01) |
| *G08B 13/24* | (2006.01) |
| *G08B 5/22* | (2006.01) |
| *G08B 25/00* | (2006.01) |
| *G08B 29/24* | (2006.01) |
| *G08B 13/00* | (2006.01) |
| *G08B 17/00* | (2006.01) |

(52) U.S. Cl.
CPC ............ *H04W 4/021* (2013.01); *G08B 5/22* (2013.01); *G08B 13/2491* (2013.01); *G08B 25/008* (2013.01); *G08B 29/24* (2013.01); *G08B 13/00* (2013.01); *G08B 17/00* (2013.01)

(58) Field of Classification Search
CPC ..... H04W 4/021; G08B 13/2491; G08B 5/22; G08B 25/008; G08B 25/002; G08B 21/0233; G08B 21/0225; G08B 31/00
See application file for complete search history.

(56) References Cited

U.S. PATENT DOCUMENTS

| | | | |
|---|---|---|---|
| 6,400,265 B1 | 7/2002 | Saylor et al. | |
| 6,509,833 B2 | 1/2003 | Tate | |
| 6,710,715 B2* | 3/2004 | Deeds | G01W 1/10 340/286.11 |
| 6,975,220 B1 | 12/2005 | Foodman et al. | |
| 7,619,512 B2* | 11/2009 | Trundle | G08B 25/10 340/506 |
| 7,746,794 B2 | 6/2010 | Sink | |
| 8,427,309 B2* | 4/2013 | Bullard | H04L 43/065 340/540 |
| 8,493,202 B1* | 7/2013 | Trundle | G08B 29/02 340/502 |
| 8,823,509 B2 | 9/2014 | Hyland et al. | |
| 9,508,247 B2* | 11/2016 | Lee | G08B 25/008 |
| 9,552,719 B1* | 1/2017 | Dey | G08B 25/008 |

(Continued)

*Primary Examiner* — An T Nguyen
(74) *Attorney, Agent, or Firm* — Morris & Kamlay LLP

(57) ABSTRACT

Systems and methods of security system settings adjustment are provided, including receiving an alert communication for a predetermined area with a communications interface of a security system, transmitting a notification message from the security system to a pre-selected device in response to the received alert communication, and changing at least one security setting of the security system in response to at least one of the received alert communication.

14 Claims, 7 Drawing Sheets

(56) References Cited

U.S. PATENT DOCUMENTS

| | | | |
|---|---|---|---|
| 9,626,858 B2* | 4/2017 | Sloo | F24F 11/30 |
| 9,826,352 B2* | 11/2017 | Rabb | G08B 25/008 |
| 9,852,605 B2* | 12/2017 | Dey | G08B 25/008 |
| 2003/0184436 A1* | 10/2003 | Seales | G08B 25/016 |
| | | | 340/531 |
| 2005/0128067 A1* | 6/2005 | Zakrewski | G08B 29/20 |
| | | | 340/511 |
| 2006/0176167 A1* | 8/2006 | Dohrmann | G08B 25/001 |
| | | | 340/506 |
| 2006/0176169 A1* | 8/2006 | Doolin | G08B 17/00 |
| | | | 340/521 |
| 2007/0194906 A1* | 8/2007 | Sink | G08B 17/10 |
| | | | 340/506 |
| 2007/0247302 A1* | 10/2007 | Martin | G08B 25/008 |
| | | | 340/506 |
| 2010/0045460 A1* | 2/2010 | Caler | G08B 25/012 |
| | | | 340/541 |
| 2010/0045461 A1* | 2/2010 | Caler | G08B 25/008 |
| | | | 340/541 |
| 2010/0198367 A1* | 8/2010 | Petricoin, Jr. | G01S 5/0018 |
| | | | 700/17 |
| 2010/0245088 A1* | 9/2010 | Meier | G08B 13/08 |
| | | | 340/545.1 |
| 2010/0315242 A1* | 12/2010 | Bullard | H04L 43/065 |
| | | | 340/584 |
| 2010/0318641 A1* | 12/2010 | Bullard | H04L 43/065 |
| | | | 709/223 |
| 2011/0058034 A1* | 3/2011 | Grass | G08B 13/19656 |
| | | | 348/143 |
| 2012/0268267 A1 | 10/2012 | Anderson | |
| 2013/0300564 A1* | 11/2013 | Lamb | G08B 25/008 |
| | | | 340/573.4 |
| 2014/0167969 A1* | 6/2014 | Wedig | G08B 7/066 |
| | | | 340/584 |
| 2014/0266669 A1* | 9/2014 | Fadell | G05B 19/042 |
| | | | 340/501 |
| 2015/0061859 A1* | 3/2015 | Matsuoka | G08B 25/008 |
| | | | 340/501 |
| 2015/0127712 A1* | 5/2015 | Fadell | G06Q 10/083 |
| | | | 709/202 |
| 2015/0154850 A1* | 6/2015 | Fadell | G06Q 10/083 |
| | | | 340/501 |
| 2016/0189505 A1* | 6/2016 | Boettcher | G08B 19/00 |
| | | | 340/541 |
| 2016/0189528 A1* | 6/2016 | Lee | G08B 25/008 |
| | | | 340/541 |
| 2016/0189529 A1* | 6/2016 | Lee | G08B 25/008 |
| | | | 340/541 |
| 2016/0189531 A1* | 6/2016 | Modi | G08B 29/185 |
| | | | 340/506 |
| 2016/0189532 A1* | 6/2016 | Malhotra | G08B 29/185 |
| | | | 340/506 |
| 2016/0343237 A1* | 11/2016 | Herman | G08B 25/008 |
| 2016/0379456 A1* | 12/2016 | Nongpiur | G08B 13/1672 |
| | | | 340/541 |
| 2017/0018167 A1* | 1/2017 | Dey | G08B 25/008 |
| 2017/0039838 A1* | 2/2017 | Lee | G08B 25/008 |
| 2017/0084161 A1* | 3/2017 | Dey | G08B 25/008 |
| 2017/0134895 A1* | 5/2017 | Rabb | G08B 25/008 |
| 2018/0041865 A1* | 2/2018 | Rabb | G08B 25/008 |

\* cited by examiner

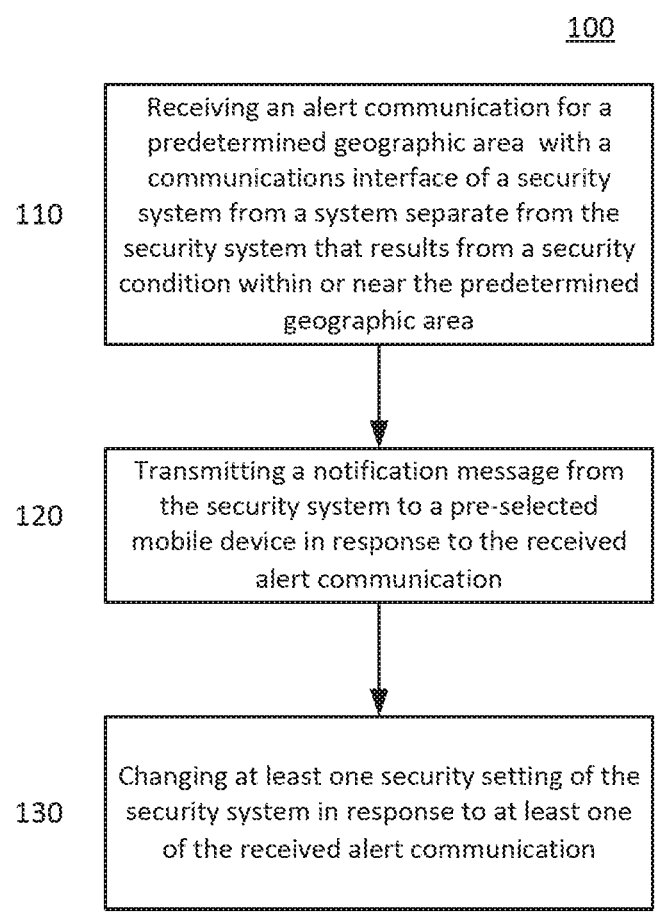

ADJUSTING SECURITY IN RESPONSE TO ALERT COMMUNICATIONS

BACKGROUND

Municipal alert services and social networks may provide information and/or alerts about security threats or concerns in a particular local area. Traditional home security systems operate according to one or more operation modes that are set by a user. For example, a conventional security system may be "armed" when a user leaves his or her home, in which an alarm will be sounded if the home perimeter is breached prior to the system being placed in an "unarmed" mode. That is, traditional home security systems operate according to a set mode of operation, and do not change operation mode based on other external factors such as alerts about security threats transmitted by municipal alert services or social networks.

BRIEF SUMMARY

Embodiments of the disclosed subject matter provide systems and methods of adjusting settings of a security system in response to alert communications. For example, in response to receiving the alert communication, a security system may adjust one or more settings so as to increase the security for a home. The alert communication may be received from a law enforcement communication system, a security service provider system, a neighborhood alert communication system, and/or a social network communication system. A security system may receive the alert, and provide notification to a user's pre-selected device. When the user is notified, the security system may either automatically adjust the system settings to increase the security in response to the notification, or may receive a selection from the user device to increase the security.

According to an embodiment of the disclosed subject matter, a method is provided that includes receiving an alert communication for a predetermined geographic area with a communications interface of a security system from a system separate from the security system that results from a security condition within or near the predetermined geographic area, transmitting a notification message from the security system to a pre-selected mobile device in response to the received alert communication, and changing at least one security setting of the security system in response to at least one of the received alert communication.

According to an embodiment of the disclosed subject matter, a security system is provided that includes a communications interface to receive an alert communication for a predetermined geographic area that results from a security condition within or near the predetermined geographic area and to transmit a notification message to a pre-selected mobile device in response to the received alert communication, and a processor to change at least one security setting in a memory coupled to the processor in response to at least one of the received alert communication.

According to an embodiment of the disclosed subject matter, means for security system settings adjustment are provided, including receiving an alert communication for a predetermined geographic area with a communications interface of a security system from a system separate from the security system that results from a security condition within or near the predetermined geographic area, transmitting a notification message from the security system to a pre-selected mobile device in response to the received alert communication, and changing at least one security setting of the security system in response to at least one of the received alert communication.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 shows a method of adjusting security system settings based on a received alert communication according to an embodiment of the disclosed subject matter.

DETAILED DESCRIPTION

Figure 2A:
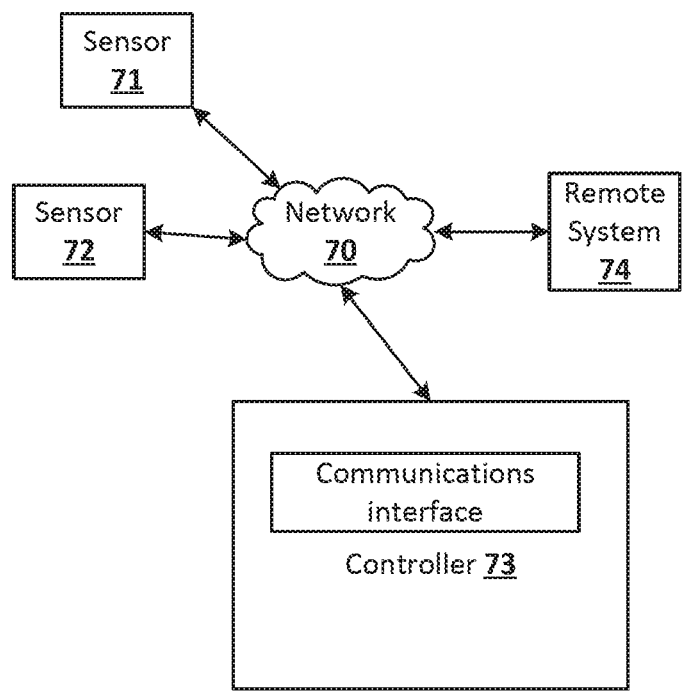
FIGS. 2A-2B show a security system that receives alert communications from a remote system according to an embodiment of the disclosed subject matter.

Embodiments of the disclosed subject matter provide systems and methods of adjusting security settings in response to alert communications that may be received from a law enforcement communication system, a security service provider system, a neighborhood alert communication system, a weather-related communications system, and/or a social network communication system. For example, in response to receiving the alert communication, a security system may adjust one or more settings.

In general, an alert communication as disclosed herein refers to a communication provided to a geographic region that results from a security condition, a regional event, and/or weather related condition that may concern residents or other users within or near the geographic region. Such an alert typically may be of interest to multiple residences, locations, buildings or the like. As discussed throughout, the alert communication may be received from a law enforcement communication system, a security service provider system, a neighborhood alert communication system, a weather-related communications system, and/or a social network communication system. For example, an alert communication sent by a law enforcement agency via the law enforcement communication system may provide a warning of a potential threat, such as a fugitive or an armed shooter, within particular neighborhoods. In another example, an alert communication may be sent by a weather-related communications system (e.g., a local, regional, and/or national weather service) regarding a potential event, such as a hurricane warning, high winds, or the like. An alert communication regarding a regional event may be, for example, an earthquake prediction, notifications regarding approaching wildfires, an emergency situation at a nearby industrial facility, or the like. In contrast, a conventional communication within a home security system, such as a user providing an indication to a control panel to arm or disarm, generally would not be considered an alert communication as disclosed herein.

The security system may automatically adjust the system settings to increase the security in response to the alert communication, or may receive a selection from the user device to adjust the setting. When the settings of the security system have been adjusted based on the received alert, the home security may be increased. For example, the security system may request a PIN, a security code, or security authorization information, may shorten an entry allowance time, and/or may share an image and/or video stream when the security is increased. In another example, the sensitivity of one or more sensors of the security system may be adjusted (e.g., increased or decreased) in response to the alert communication. The sensitivity of the sensors may be increased when, for example, the alert communication warns of suspicious activity in the user's neighborhood, and may decrease the sensitivity when an earthquake warning alert communication is received.

Figure 2B:
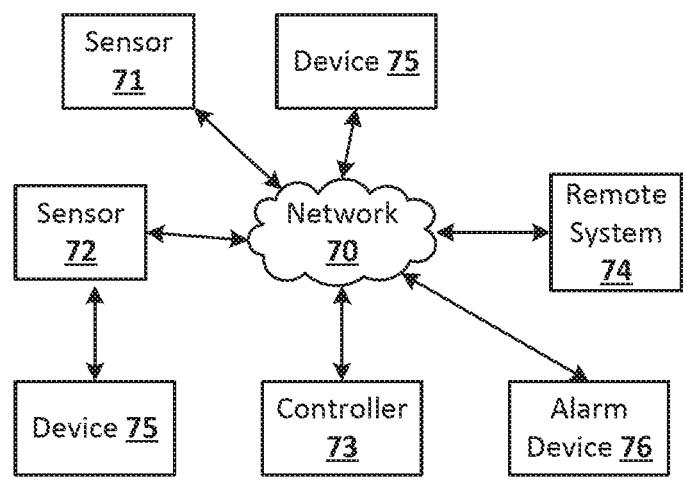

FIG. 1 shows a method 100 of adjusting security system settings based on a received alert communication according to an embodiment of the disclosed subject matter. An example of the security system having settings that may be adjusted is shown in FIGS. 2A-2B and is discussed below. The alert communication may be transmitted from a remote system to a communications interface of a controller of the security system. As discussed in detail below, the remote system may be a law enforcement communication system, a security service provider system, a neighborhood alert communication system, a weather-related communications system, and/or a social network communication system. An alert communication for a predetermined geographic area may be received with a communications interface of the security system from a system separate from the security system that results from a security condition within or near the predetermined geographic area at operation 110. A notification message may be transmitted from the security system to a pre-selected mobile device in response to the received alert communication at operation 120. At least one security setting of the security system may be changed in response to at least one of the received alert communication at operation 130.

In operation 130, where the security settings of the system may be changed, an entry allowance time period may be changed. That is, the amount of time that a user may have to enter a home to disarm the security system may be decreased.

In some embodiments, when the security settings are changed in operation 130, a message may be transmitted to a designated emergency contact using the communications interface of the security system. For example, the message may be a call, a text, and/or an email with content indicating a change in the security settings and/or providing information about the alert communication. In some embodiments where the security settings of the system are changed, at least one of an image and/or a video stream captured from an image sensor of the security system may be transmitted to at least the preselected device. This may allow a user to observe one or more areas around their home to watch for conditions relating to the alert communication.

In some embodiments, when the at least one security setting is changed at operation 130, the security system may be disarmed when at least one of a PIN, a security code, and transmitted security authorization information is received by the security system. That is, the security to enter a home may be increased by requesting that a PIN, security code, or authorization information be transmitted and/or input before allowing entry into the home.

In some embodiments of the disclosed subject matter, a selection may be received to accept the changing of the at least one security setting from the pre-selected device in response to the notification message. That is, the device may receive information regarding the alert communication and a notification regarding a proposed setting change to increase security. The user may approve and/or accept the change to increase security via the device.

In some embodiments of the disclosed subject matter, the method 100 may include updating the changed at least one security setting in response to at least one of an updated alert communication, a received selection from the pre-selected device, and a selection received from a user interface of the security system. An updated alert communication may recall and/or provide additional information regarding the previously-transmitted alert communication. In some embodiments, the settings of the security system may be adjusted in response to the updated alert. For example, the updated alert communication may indicate that the police have apprehended a suspect that they were searching for in the area. In response to the updated alert, the security system may reduce the level of security (e.g., the settings may be returned to their values before the alert communication was received). The security system may also be updated in response to a user selection received from an interface of the security system and/or a user device communicatively coupled to the security system (e.g., to approve or deny a change according to a received alert communication).

The security may be increased when an alert communication is received by the security system, and the settings of the security system may be adjusted (e.g., to their values before the alert notification was received or to a different setting) when an updated alert communication is received by the security system. That is, the settings of the security system may be adjusted (e.g., to increase or decrease security) in response to one or more alert communications and/or update communications received.

In some embodiments, the method 100 may include adjusting the sensitivity of at least one sensor of the security system according to a type of the received alert communication. For example, the sensitivity of a door and/or window sensor may be increased in response to receiving an alert communication that a burglary activity has occurred in the user's neighborhood. In another example, the sensitivity of a door and/or wind sensor may be decreased when the alert communication indicates that high winds are predicted.

In some embodiments, the method 100 may include analyzing the alert communication to determine an alert type. An alert type may be, for example, a security threat alert type (e.g., suspicious activity or burglary attempt in the user's neighborhood, or the like), a weather event alert type (e.g., high winds, hurricane, or the like), and/or an regional event alert type (e.g., an earthquake, spread of wildfires to neighborhoods, etc.) and changing the at least one security setting of the security system according to the determined alert type. For example, the sensitivity of one or more sensors may be changed according to the alert type. A sensitivity may be decreased, for example, when a weather-event alert type is determined (e.g., high wind alert), and may be increased, for example, when a security alert is determined (e.g., suspicious activity or burglary attempt in the user's neighborhood, or the like).

FIGS. 2A-2B show a security system that receives alert communications from a remote system according to an embodiment of the disclosed subject matter. In some embodiments, the security system may adjust security settings according to an alert communication received. The security system may, in some embodiments, determine when to arm or disarm an alarm device according to at least one of occupancy of the home, geo-location data, a location of a user's electronic device (e.g., a user's smartphone, smart watch, wearable computing device, key FOB, or the like), sensor data, and aggregated data regarding the times and days of the user's presence in the home.

The security system shown in FIGS. 2A-2B may include a network 70, sensors 71, 72, controller 73 having a communications interface, remote system 74, device 75, and alarm device 76. Sensors 71, 72 will be discussed in detail in connection with FIG. 5, and device 75 will be discussed in detail in connection with FIG. 6. As shown in the embodiments of FIGS. 2A-2B and described below, alert communications may be received via the communications interface of the controller 73 that are transmitted by the remote system 74.

The remote system 74 may be a law enforcement communication system, a security service provider system, a neighborhood alert communication system, a weather-related communications system, and/or a social network communication system. In response to receiving the alert communication from the remote system 74, the controller 73 may adjust the settings of the security system so as to increase the security.

The security system of a home may be registered with the remote system 74 such that when security threats for a particular local area that includes and/or is near the security system are known, the remote system 74 may transmit an alert communication to the controller 73 of the security system. When the security system receives the alert communication, the controller 73 may adjust one or more settings of the security system to increase security.

For example, if the remote system 74 is a law enforcement communication system, the system may be a police communication system. Alternatively, the remote system 74 may be a fire communication system and/or an emergency response communication system. In the example where the remote system 74 is a police communication system, the remote system 74 may transmit an alert communication via the network 70 to the controller 73 about a crime event, a security threat to the area, an active search for a fugitive in the area, a police search for a suspect in a crime in the area, a hostage situation, and/or any other criminal or terrorist activity.

In another example, the remote system 74 may be a security service provider system. That is, a private security service may include a communication system that may transmit alert communications to the communications interface of the controller 73. The alert communications may be based on a security threat to the area. The controller 73 may adjust one or more settings of the security system to increase security.

In another example, the remote system 74 may be a neighborhood alert communication system. The security system may be registered with the neighborhood alert communication system, and the controller 73 may receive alert communications. The neighborhood alert communication system may receive notifications and/or alerts from users (e.g., one or more members of the neighborhood that are registered users with the neighborhood alert communications system) regarding security threats to the neighborhood, and the neighborhood alert communication system may distribute this information as alert communications. For example, the notifications and/or alerts from users may be for suspicious activity observed in the neighborhood. Suspicious activity may include, for example, appearance of a break-in attempt, vehicles and/or persons not typically seen in the neighborhood, or the like. In addition to security threats reported by users, the neighborhood alert communication system may transmit notification alerts based on communications received from law enforcement, fire departments, and/or emergency services for a particular neighborhood and/or area.

In another example, the remote system 74 may be a weather-related communications system. The security system having controller 73 may be registered with the weather-related communications system. When a weather alert is received, the security system may adjust one or more settings according to the type of weather-related event. For example, if a high wind advisory, hurricane alert, earthquake alert, or the like is received, the controller 73 may reduce the sensitivity of the sensors 71, 72 which may be, for example, window sensors and/or door sensors.

In yet another example, the remote system 74 may be a social network communication system. The security system having controller 73 may be registered with the social network communication system, and/or a user of the security system may be registered with the social network communication system. The social network communication system may receive notifications and/or alerts from users (e.g., one or more members of the social network communication system that may be in the same area) regarding security threats to a particular area, and the social network communication system may distribute this information as alert communications. The notifications and/or alerts from users may be, for example, for suspicious activity observed in an area, and/or law enforcement, fire department, and/or emergency services presence in the area. In addition to security threats reported by users, the social network communication system may transmit notification alerts based on communications received from law enforcement, fire departments, and/or emergency services for the particular area.

The controller 73 may adjust one or more security settings when an alert communication is received. For example, the security system may typically operate under a presumption that one or more persons detected approaching a house and attempting to enter may be a user. When the alter communication is received, the controller 73 may adjust the settings so that the system presumption of one or more persons detected approaching a house and attempting to enter may be intruders.

For example, in some embodiments, the controller 73 may increase the sensitivity of sensors 71, 72 when an alert communication is received, where the remote system 74 may be one of the law enforcement communication system, the security service provider system, neighborhood alert communication system, the social network communication system, or the like. For example, when an alert communication is received that indicates that there is burglary activity in the neighborhood of the user's home, the controller may increase the sensitivity of the sensors 71, 72, which may be window and/or door sensors.

In some embodiments, the security system shown in FIGS. 2A-2B may determine whether the user is located within the home or building (or a predefined area around the home or building), and/or outside of the home. That is, when an alert communication is received, the security system may adjust the security settings according to whether the user is located within the home or outside the home.

When the security system is disarmed because a user is located at home, and an alert communication is received, the controller 73 may change the setting so that the security system monitors sensors on exterior doors and/or windows of the home, and/or monitors sensors disposed around the perimeter of a home. That is, with the receipt of the alert communication when the user is home, the security system transitions from a disabled state to a home state, where sensors on external doors and/or windows are monitored, and/or sensors on the exterior of a home and/or disposed along an external perimeter of a home are monitored. In some embodiments, the security system may transmit a notification to a user device (e.g., device 75) regarding the changing in security settings is response to the alert communication. In some embodiments, the user device 75 may receive a selection from a user to approve or disapprove the change in the security settings.

In another example, the home may be unoccupied, and the security system may be operating in an away or a vacation mode. In these modes, a door sensor, window sensors, sensors that are internal to the home (e.g., motion sensors), and/or perimeter sensors may be monitored by the controller 73. The system may operate in an away mode when the user is away for a predetermined period of time during a day, and may operate in a vacation mode when a user does not return to the home in several days, a week, two weeks, or the like. For example, when an alert communication is received when the system is operating in the away or vacation mode, the controller 73 may adjust the security settings so as to request the entry of a PIN, a security code, and/or transmitted security authorization information (e.g., information that is transmitted from a user device that stores the authorization information) to allow access to the home. The PIN and/or security code may be transmitted from the user device or may be received from a user interface coupled to the controller 73. In some embodiments, the security system may reduce the amount of time allocated for a person to enter the home and disarm the security system. As described above, the security system may transmit a notification to a user device (e.g., device 75) regarding the change in security settings is response to the alert communication. In some embodiments, the user device may receive a selection from a user to approve or disapprove the change in the security settings.

In some embodiments, when the controller 73 receives an alert communication from the remote system, the controller 73 may call, send a text message, and/or send an email to an emergency contact. The contact information may be stored in the controller 73 and/or in a storage device coupled to the controller 73. The emergency contact may be a user of the security system, or one or more persons designated by the user of the security system. The security system may be set so as to transmit a message (e.g., call, text, and/or email) upon the receipt of the alert communication.

In some embodiments of the disclosed subject matter, the controller 73 may provide images and/or video captured from sensors 71, 72 to a user device 75 when an alert communication is received so that the user may monitor one or more locations in and/or around the perimeter of the home in response to the alert. For example, sensors 71, 72 may be image sensors and/or video cameras that are disposed outside a home, and may provide images and/or video of an area near the home, such as a street. Alternatively, the controller 73 may transmit a notification to the user device of the received alert, and the device 75 may receive a selection to receive one or more images and/or video that are captured by sensor 71, 72.

Figure 3A:
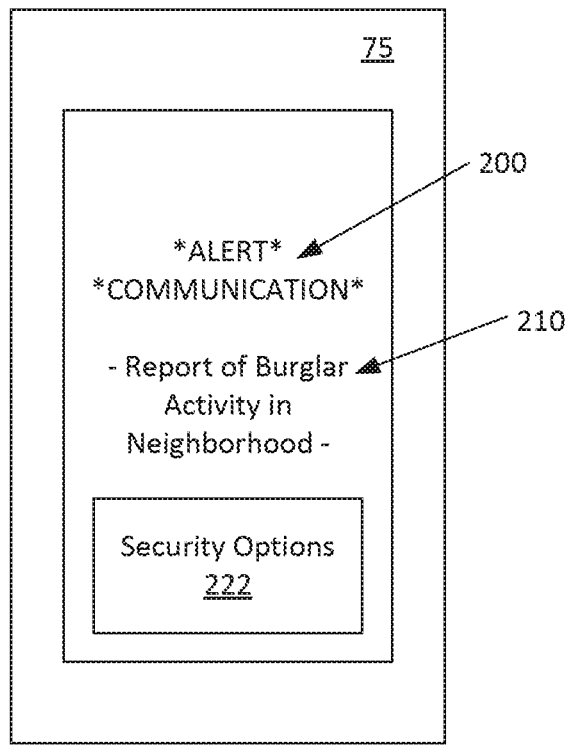
FIGS. 3A-3B show an example alert communication for a potential security threat displayed on a mobile device and example security options according to an embodiments of the disclosed subject matter.
Figure 3B:
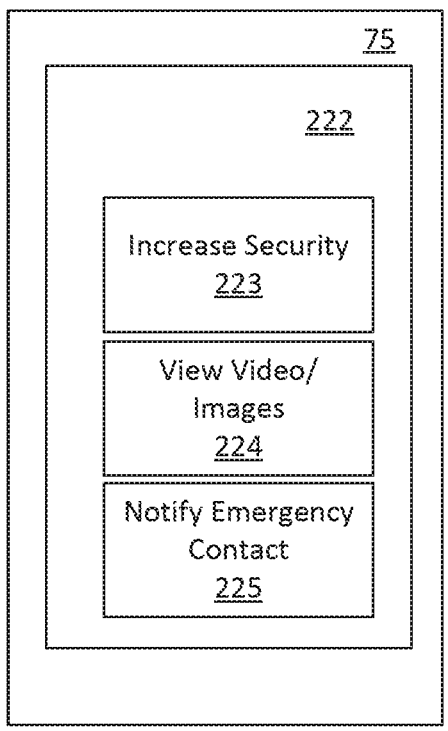

FIGS. 3A-3B show an example alert communication for a potential security threat displayed on a mobile device and example security options according to an embodiments of the disclosed subject matter. As shown in FIG. 3A, a user device 75 may receive an alert communication 210, and may display it on a display (e.g., display 22 showing in FIG. 6). As described throughout, the alert communication may be received from a law enforcement communication system, a security service provider system, a neighborhood alert communication system, a weather-related communications system, and/or a social network communication system. Alternatively, or in addition, the alert communication may be received from the controller 73 via the network 70.

In the example shown in FIG. 3A, the received alert communication 200 may be a report 210 of burglar activity in the neighborhood of a user's home and/or an area near the user's home. The user device 75 may display and/or provide security options 222 that may be selected by the user to, for example, adjust the settings of the security system. As shown in FIG. 3B, the security options 222 may include an option 223 to increase security, an option 224 to receive video and/or image from one or more cameras of the security system, and an option 225 to notify an emergency contact. When option 223 is selected by the user so as to increase the security, the controller 73 (e.g., as shown in FIGS. 2A-2B) may, for example, increase the sensitivity of one or more sensors 71, 72 of the security system, change the operating mode of the security system (e.g., from a disarmed mode to a "stay" mode), and the like. In some embodiments, the selection of option 223 to increase security may change the settings of the security system according to at least the type of alert communication received. For example, the when the alert communication relates to a report of a burglar activity in the neighborhood, the security system may increase the sensitivity of one or more sensors 71, 72.

When the option 224 is selected, video images and/or still images that are captured by the one or more sensors 71, 72 may be provided from the security system (e.g., the controller 73) to the user device 75. In some embodiments, the user may select option 223 to increase security upon viewing the video and/or still images.

The user may select option 225 shown in FIG. 3B to notify an emergency contact regarding the alert communication 200. For example, emergency contact information may be stored by the user device 75, and at least one of an email, a text message, and/or a phone call may be initiated and/or sent when option 225 is selected. For example, the alert communication 200 may be received from a neighborhood alert communication system, and the user may select option 225 to contact local law enforcement regarding the alert communication (e.g., upon viewing video and/or still images). In another example, the user may be away from home and receive the alert communication 200 with the user device 75, and may select option 225 to notify another user in the home about the received alert communication 200.

Figure 3C:
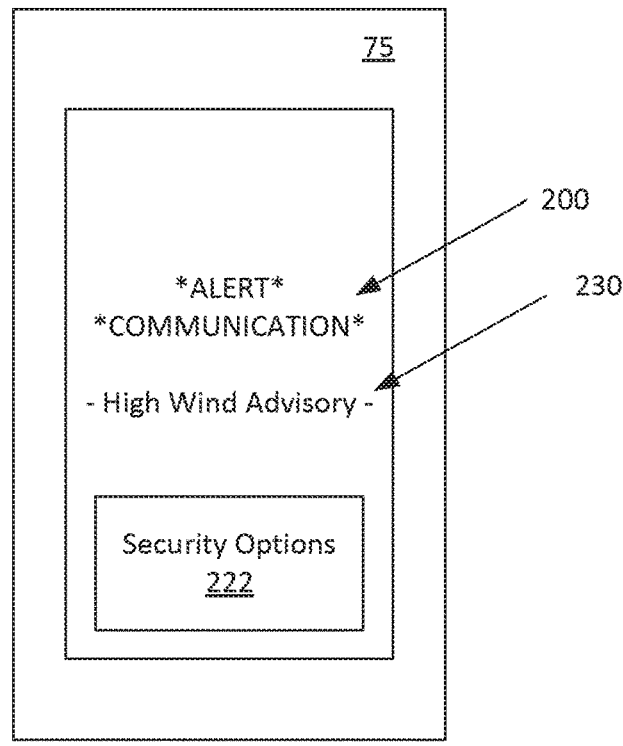
FIGS. 3C-3D show an example alert communication for a potential weather threat displayed on a mobile device and example security options according to an embodiments of the disclosed subject matter.
Figure 3D:
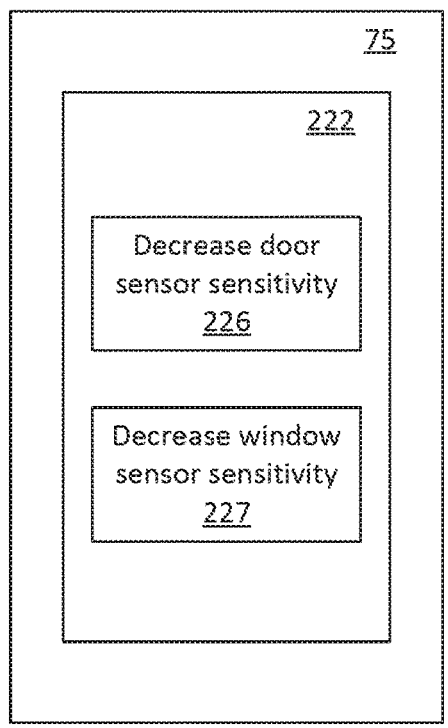

FIGS. 3C-3D show an example alert communication for a potential weather threat displayed on a mobile device and example security options according to an embodiments of the disclosed subject matter. FIG. 3C shows that the user device 75 may display an alert communication 200 related to a weather-related event 230. As shown in FIG. 3C, the weather-related event 230 may be a high wind advisory. The user may select security options 222 to adjust the setting of the security system according As shown in FIG. 3D, the security options 222 may include an option 226 to decrease door sensor sensitivity, and/or an option 227 to decrease window sensor sensitivity. As the alert communication 200 is for a weather event related to high winds, a user may wish to decrease the sensitivity of door and/or window sensors so as to avoid false alarms. In some embodiments, the controller 73 may automatically change the sensitivity of the door and/or window sensors of the home to reduce sensitivity according to a type of weather-related event 230.

The general features and operation of the security system shown in FIGS. 2A-2B, which may be part of a smart-home environment, are discussed in detail below. The security system may use one or more sensors 71, 72. As used throughout, a sensor may refer to any device that can obtain information about its environment. Sensors may be described by the type of information they collect. For example, sensor types as disclosed herein may include motion, smoke, carbon monoxide, carbon dioxide, sound, proximity, temperature, time, physical orientation, acceleration, location, entry, presence, and the like. A sensor can include, for example, a camera, a retinal camera, and/or a microphone. Sensors 71, 72 are discussed in detail below in connection with FIG. 5.

The security system of FIGS. 2A-2B and discussed above may be implemented over any suitable wired and/or wireless communication networks, such as network 70. The one or more sensors 71, 72 may communicate via the local network 70, such as a Wi-Fi or other suitable network, with each other and/or with the controller 73. The security system may be communicatively coupled to the remote system 74 via the network 70. As discussed above, the remote system 74 may be a law enforcement communication system, a security service provider system, a neighborhood alert communication system, a weather-related communications system, and/or a social network communication system.

The network 70 may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use.

The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The controller 73 shown in the security system of FIGS. 2A-2B and discussed above may be communicatively coupled to the network 70 and may be and/or include a processor. Alternatively, or in addition, the controller 73 may be a general- or special-purpose computer. The controller 73 may receive, aggregate, and/or analyze alert communications received from the remote system 74 via the network 70. The controller 73 may also receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system.

Alternatively or in addition, sensors 71, 72 may communicate directly with the remote system 74. In this example, the remote system 74 may aggregate data from multiple locations, provide instruction, software updates, and/or aggregated data to a controller 73 and/or sensors 71, 72. In another example, the remote system 74 may aggregate data from the sensors 71, 72, may analyze the aggregated data, and transmit an alert communication to a user device (e.g., device 75) and/or other security systems coupled to the remote system 74 (e.g., other devices that are coupled to and/or have registered with the remote system 74).

The sensor network that may include sensors 71, 72 shown in FIGS. 2A-2B may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart-home environment can control and/or be coupled to devices outside of the structure. For example, one or more of the sensors 71, 72 may be located outside the structure, for example, at one or more distances from the structure (e.g., sensors 71, 72) may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIGS. 2A-2B may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIGS. 2A-2B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIGS. 2A-2B, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIGS. 2A-2B, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIGS. 2A-2B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIGS. 2A-2B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIGS. 2A-2B. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIGS. 2A-2B can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIGS. 2A-2B can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, smart watch, wearable computing device, a tablet, a key FOB, a radio frequency and the like). A webpage or application can be configured to receive communications from the user and control the one or more of the network-connected smart devices based on the communications and/or to present information about the device's operation to the user. For example, the user can view the webpage and/or the application, and can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. The smart-home environment may provide notifications to users when there is an attempt to use network-connected smart devices in a manner that is atypical from the learned pattern of usage. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event any of the network-connected smart devices, such as smart wall plugs located outdoors, detect movement at night time, the controller 73 and/or remote system 74 can activate the outdoor lighting system and/or other lights in the smart-home environment.

In embodiments of the disclosed subject matter, the remote system 74 shown in FIGS. 2A-2B may be a law enforcement provider system, a home security provider system, a medical and/or emergency services provider system, and/or a fire department provider system. When a security event and/or environmental event is detected by at least one of one sensors 71, 72, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 may generate and transmit the message to the remote system 74. In another example, when one of the sensors 71, 72 detects a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., an alert communication, a security event, an environmental event, an operational condition, or the like). For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user (e.g., using images captured by the sensor, and comparing them with pre-stored images, and/or according to identifying information from the device of a user, such as a smartphone, smart watch, wearable computing device, key FOB, RFID tag, or the like), and the security system may display the operational status message.

FIG. 2B shows a security system that includes an alarm device 76, which may include a light and an audio output device. The alarm device 76 may be controlled, for example, by controller 73. The light of the alarm device 76 may be activated so as to be turned on when one or more sensors 71, 72 detect a security event and/or an environmental event. Alternatively, or in addition, the light may be turned on and off in a pattern (e.g., where the light is turned on for one second, and off for one second; where the light is turned on for two seconds, and off for one second, and the like) when one or more sensors 71, 72 detect a security event and/or an environmental event. Alternatively, or in addition, an audio output device of the alarm device 76 may include at least a speaker to output an audible alarm when a security event and/or an environmental event is detected by the one or more sensors 71, 72. For example, a security event may be when one or more sensors 71, 72 are motion sensors that detect motion either inside a building having the security system disclosed herein, or within a predetermined proximity to the building. The speaker of the alarm device 76 may, for example, output a message when the user arrives at the building or departs from the building according to the operational status of the security system (e.g., a security and/or environmental event has been detected, an operational issue with the security system has been detected, the security system has been armed and/or disarmed, or the like).

Figure 6:
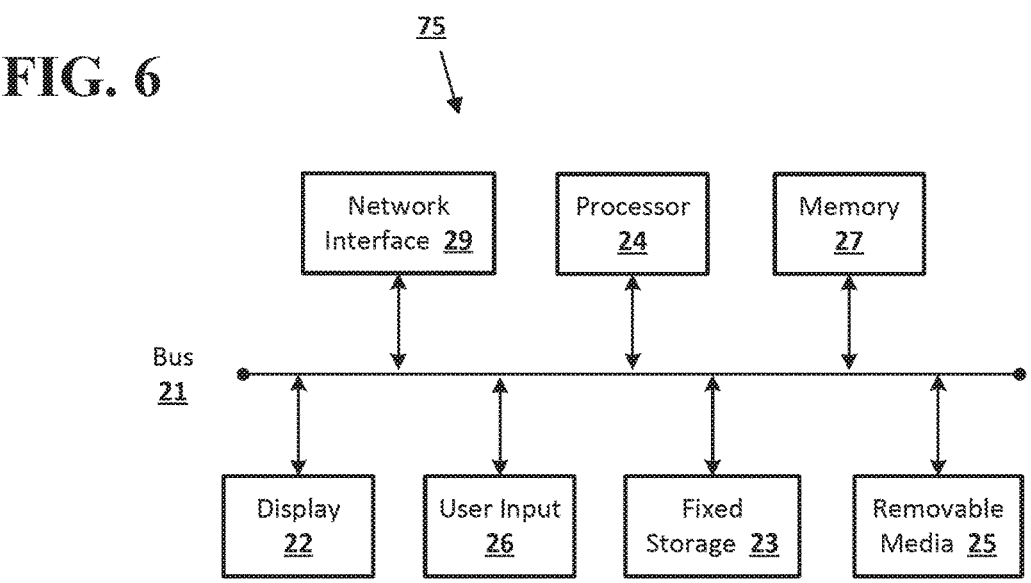
FIG. 6 shows an electronic device according to embodiments of the disclosed subject matter.

FIG. 2B shows a device 75 that may be communicatively coupled to a sensor. Although FIG. 2B illustrates that device 75 is coupled to sensor 72, the device 75 may be communicatively coupled to sensor 71 and/or sensor 72. The device 75 may be a computing device as shown in FIG. 6 and described below, and/or a key FOB. A user of the security system disclosed herein may control the device 75. When the device 75 is within a predetermined distance (e.g., one foot, five feet, 10 feet, 20 feet, 100 feet, or the like) from the sensor 72, the device 75 and the sensor 72 may communicate with one another via Bluetooth signals, Bluetooth Low Energy (BTLE) signals, Wi-Fi pairing signals, near field communication (NFC) signals, radio frequency (RF) signals, infra-red signals, and/or short-range communication protocol signals. For example, the user may present the device 75 within the predetermined distance range of the sensor so that the device 75 and the sensor may communicate with one another. The device 75 may provide identifying information to the sensor 72, which may be provided to the controller 73 to determine whether the device 75 belongs to an authorized user of the security system disclosed herein. The controller 73 may monitor the location of the device 75 in order to determine whether to arm or disarm the alarm device 76. The controller 73 may arm or disarm the alarm device 76 according to, for example, whether the device 75 is within a home, building, and/or a predetermined area. The predetermined area may be defined, for example, according to, for example, geo-fencing data, placement and/or range of sensors 71, 72, a defined distance from the building having the security system disclosed herein, and the like.

In example embodiments of the disclosed subject matter, the device 75 may be associated with an authorized user. Authorized users may be those users, for example, who have identifying information stored and/or registered with the controller 73. Identifying information may include, for example, images of the user, voice recordings of the user, identification codes that are stored in a user's device, user PIN codes, and the like.

For example, when the authorized user and the device 75 are outside of the home, building, and/or predetermined area, the controller 73 may arm the alarm device 76. In determining whether to arm the alarm device 76, the controller may gather data from the sensors 71, 72, to determine whether any other person is in the building. When the alarm device 76 is armed, and the user and the device 75 return to the home, building, and/or predetermined area of the security system, the controller 73 may disarm the alarm device 76 according to the signals received by the sensors 71, 72 from the device 75. The exchanged signals may include the identifying information of the user.

In FIGS. 2A-2B, the sensor 71, 72 may be a camera to capture an image of a face of a person to be transmitted to the controller 73, where the controller 73 compares the captured facial image with a pre-stored image. When it is determined by the controller 73 that at least a portion of the captured facial image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a camera to capture a retinal image from a person to be transmitted to the controller 73, where the controller 73 compares the captured retinal image with a pre-stored image. When it is determined by the controller 73 that at least a portion of the captured retinal image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a microphone to capture a voice of a person to be transmitted to the controller 73, where the controller 73 compares the captured voice with a pre-stored voice. When it is determined by the controller 73 that at least a portion of the captured voice matches the pre-stored voice, the controller 73 determines that the person is an authorized user of the security system disclosed herein.

When the sensor 72 and/or the controller 73 determine that the device 75 is associated with an authorized user according to the transmitted identification information, the sensor 72 and/or the controller 73 provide an operational status message to the user via a speaker (i.e., audio output 77), a display (e.g., where the display is coupled to the controller 73 and/or remote system 74), and/or the device 75. The operational status message displayed can include, for example, an alert communication and/or a message that a security event and/or environmental event has occurred. When the sensors 71, 72 have not detected a security and/or environmental event, a message may be displayed that no security and/or environmental event has occurred. When the controller 73 has not received an alert communication from the remote system 74, a message may be displayed that no alert communication has been received. In embodiments of the subject matter disclosed herein, the device 75 may display a source of the security event and/or environmental event, a type of the security event and/or environmental event, a time of the security event and/or environmental event, and a location of the security event and/or environmental event. In some embodiments, the device 75 may display the alert communication, and may include information about the alert (e.g., the cause of the alert, the source of the alert, and the like).

In embodiments of the disclosed subject matter, the device 75 may be communicatively coupled to the network 70 so as to exchange data, information, and/or messages with the sensors 71, 72, the controller 73, and the remote system 74. The device is discussed below in further detail in connection with FIG. 6.

In embodiments of the disclosed subject matter, the controller 73 can request entry of an access code from the device 75 and/or a keypad communicatively coupled to the controller 73. Upon receipt of the access code, the security system disclosed herein may be disarmed, and/or may provide an operational status message to the user via a display coupled to the controller 73 and/or the device 75. Alternatively, or in addition, an operational status message may be output via a speaker of the alarm device 76. In some embodiments, the operation status message may include an alert communication, and/or whether an alert communication has been received.

For example, a preset time (e.g., 15 seconds, 30 seconds, 1 minute, 5 minutes, or the like) may be set for the security system to allow for a user to exit the home or building before arming the alarm device 76. A preset time may be set for the security system to allow for a user to enter the home and disarm the alarm device 76. In some embodiments, when an alert communication is received, the preset time for entry may be reduced.

The preset time for entry of the home and the preset time to exit the home may be the same amount of time, or can be set to provide different amounts of time. If a user needs more time to enter or exit the home with the security system, an electronic device of the user (e.g., a smartphone, smart watch, wearable computing device, radio frequency identification (RFID) tag, fitness band or sensor, a key FOB, or the like, such as device 75) can request, upon receiving input from the user, that the controller 73 provide additional time beyond the preset time to allow for the user to enter or exit the home. Alternatively, or in addition, the security system disclosed herein may extend the preset time to enter or exit. For example, the time may be extended for exiting the home while the user and/or the user's electronic device are in the home. That is, the sensors 71, 72 may determine that the user and/or the user's registered electronic device are in the home and are engaged in moving towards exiting, and the controller 73 may extend the preset time to exit. Alternatively, or in addition, the device 75 may transmit a command (e.g., when input is received from the user) to the controller 73 to disengage the exit process (e.g., the controller 73 and/or the alarm device 76 are disengaged from counting down the preset time before arming the alarm device 76).

In another example, when the user returns home, a preset time for entry to disarm the alarm device 76 may be extended according to whether the user has an electronic device (e.g., device 75, which may be a smartphone, smart watch, wearable computing device, RFID tag, fitness band or sensor, key FOB, or the like) that is registered with the controller 73. That is, the sensors, 71, 72 may detect the presence of the device 75 with the user, and may disarm the alarm device 76. When the sensors 71, 72 determine that the user does not have the device 75, the controller 73 may extend the preset time so that a user may be given additional time to enter a code on, for example, a keypad communicatively coupled to the controller 73, to disarm the alarm device 76.

In another example, when an alert communication is received by controller 73 from the remote system 74, the controller 73 may reduce the preset time. In some embodiments, the user may accept or decline the change to the setting of the security system via the device 75 when the alert communication and/or a settings change notification is displayed on the device 75.

As illustrated in FIGS. 2A-2B, a security system can include sensors (e.g., sensors 71, 72) to detect a location of at least one user, and generate detection data according to the detected location of at least one user of the security system. The detection data may be generated by the sensors 71, 72. For example, the at least one user may be one or more members of a household, and the security system may monitor their location using the sensors 71, 72 to determine whether to arm or disarm the alarm device 76. A processor, such as the controller 73 illustrated in FIGS. 2A-2B and described above, may be communicatively coupled to the sensors 71, 72, and can receive the detection data. The controller 73 can determine whether the at least one user is occupying a home, building, and/or within a predetermined area according to the detection data. The predetermined area may be set according to the boundaries of a home or building, geofencing data, motion data, a door position event, a distance from one or more sensors, and the like.

In determining the location of a user, the sensors 71, 72 can detect the location of one or more electronic devices (e.g., device 75) associated with a user. The one or more devices may be registered with the controller 73 and/or the remote system 74. As discussed above, sensors 71, 72 may communicate with another via Bluetooth signals, Bluetooth Low Energy (BTLE) signals, Wi-Fi pairing signals, near field communication (NFC) signals, radio frequency (RF) signals, infra-red signals, and/or short-range communication protocol signals. The device 75 may provide identifying information to the sensor 72, which may be provided to the controller 73 and/or the remote system 74 to determine whether the device 75 belongs to an authorized user of the security system disclosed herein. When the controller 73 and/or the remote system 74 determine that the device is an authorized device of the user, the controller 73 and/or the remote system 74 may determine the location of the device 75.

The sensors 71, 72 may be used determine whether the user associated with the device 75 can be identified with the device. For example, the sensors 71, 72 can determine whether an authorized user has a physical presence with the registered device (e.g., device 75), or whether an unauthorized person has possession of an authorized device. For example, as discussed above, a sensor 71, 72 having a camera can capture an image to determine if an authorized user has possession of the located device 75.

In some embodiments, the sensors 71, 72 can detect a location of the user is outside of the home, building, and/or predetermined area, and that a user's first electronic device (e.g., a smartphone, smart watch, wearable computing device, or the like) is within the home, building, and/or predetermined area. The controller 73 can determine whether to arm the alarm device 76 according one a location of a user's second electronic device (e.g., a key FOB, RFID tag, fitness band or sensor, or the like), geofencing data, and the detection data from the sensors 71, 72.

The security system disclosed herein includes an alarm device, such as the alarm device 76 illustrated in FIG. 2B and discussed above, which can be armed or disarmed by the controller 73 according to the determination as to whether the at least one user is occupying the home or building, and/or within the predetermined area.

For example, if the controller 73 determines that the members of a household (e.g., the users of the home security system) have exited the house (e.g., are no longer occupying the home or building, and are outside of the predetermined area), the controller 73 may arm the alarm device 76. After exiting, controller 73 may request confirmation from the user, via the device 75, to arm the alarm. The sensors 71, 72 may determine the location of the members of the household according to their respective electronic devices (e.g., smartphones, smart watch, wearable computing device, tablet computers, key FOBs, RFID tag, fitness band or sensor, and the like), according to images captured by the sensors, according to the sensors detecting one or more doors opening and closing, and the like.

For example, the sensors 71, 72 may detect one or more doors opening and/or closing, the controller 73 may determine an approximate location of a user, according to the location of the sensor for the door, and what direction the door was opened and/or closed in. The data generated by the door sensors 71, 72 regarding the directional opening of the door, as well as the location of the sensor, may be used along with other sensor data from sensors 71, 72 (e.g., motion data, camera images, sound data, and/or thermal data, and the like) to provide an improved location determination of the user.

The controller 73 may aggregate detection data from the sensors 71, 72 and store it in a storage device coupled to the controller 73 or the network 70. The data aggregated by the controller 73 may be used to determine entrance and exit patterns (e.g., what days and times users enter and exit from the house, what doors are used, and the like) of the members of the household, and the controller 73 may arm or disarm the alarm device 76 according to the determined patterns.

In embodiments of the disclosed subject matter, one or more user electronic devices (e.g., device 75) can be registered with the processor, and the at least one of the sensors 71, 72 transmits a location request signal to the device 75. In response to the location request signal, the device 75 can transmits a location signal, and the controller 73 can determine the location of the device 75 according to the received location signal. The location request signal and the location signal can be Bluetooth signals, Bluetooth Low Energy (BTLE) signals, radio frequency (RF) signals, near field communications (NFC) signals, and the like.

The controller 73 can transmit a request message to be displayed by the device 75. The message may be, for example, a reminder to arm or disarm the alarm device 76. In some embodiments, the message may include information about a received alert communication, and/or changes to the settings of the security system in response to the received alert communication. Upon displaying the message the electronic device receives input to arm or disarm the alarm device 76 according to the displayed request message, and transmits the received input to the controller 73 so as to control the alarm device 76. When an alert communication has been received, additional information may be requested, such as a PIN, security code or the like. For example, the controller can request a code from the user to either arm or disarm the alarm device 76. When the user provides the code to the device 75, which correspondingly transmits the entered code to the controller 73, the controller 73 may control the arming or disarming of the alarm device 76. Alternatively, or in addition, the controller 73 can control the alarm device 76 to be automatically armed when the user is no longer occupying the home or building, and/or is outside of the predetermined area. Alternatively, or in addition, the controller may control the arming or disarming of the alarm device 76 according to a code that entered in a keypad that is communicatively coupled to the controller 73.

In embodiments of the disclosed subject matter, authentication requirements for arming or disarming of the alarm device 76 may be reduced when a device 75 is used to arm or disarm, and the device 75 is a registered device. When a button on the registered device 75 or displayed by the device 75 is used to arm or disarm the alarm device 76, the user may not have to enter a code, a shortened PIN code, a voice code, or the like. As discussed above, in some embodiments, authentication requirements for disarming the alarm device 75 may be increased when an alert communication is received by the security system.

When the sensors 71, 72 for an entry door to the home or building become disconnected from the network 70 and the controller 73, and the alarm device 76 is armed, the user may still re-enter the home. The security system may learn which doors are used by the user to enter and/or exit a home. The sensors 71, 72 associated with the doors that are used to enter and/or exit the home may store identifying information, so that the user may present a device 75 to the sensors 71, 72 to exchange identifying information to allow the user to enter the door. Once the user enters, the user may manually disarm the alarm device 76 by entering a security code. In some embodiments, such as when an alert communication is received, the time permitted to manually disarm the alarm device 76 may be reduced.

The security system may learn the how the user typically arms and disarms the alarm device 76 (e.g., using a keypad, using the device 75, allowing for auto-arming, or the like). The device 75 may receive a message from the controller 73 when there is an attempt to disarm the alarm device 76 at a time of day and/or in a manner that is inconsistent with a user history or pattern for disarming. The controller 73 may request that the user of device 75 confirm whether the disarming is authorized, and may provide information from sensors 71, 72 (e.g., images captured of the person attempting the disarming) to assist in the confirmation. Via the device 75, the user may confirm or deny the request by the controller 73 to disarm the alarm device.

In embodiments of the disclosed subject matter, the alarm device 76 can be armed or disarmed by the controller 73 according to geo-location data from the sensors 71, 72 and/or the device 75. For example, if the sensors 71, 72 determine that the device 75 is physically located with an authorized user (e.g., as discussed above) according to geo-location data received from the device 75, and the user has exited the home and there are no other users in the home according to the sensors 71, 72, the controller 73 can automatically arm the alarm device. Alternatively, the controller may transmit a request message to the device 75 to determine if the user would like to arm the alarm device 76. For example, the message may display a selectable button to arm or disarm the alarm device 76. In another example, one or more sensors 71, 72 may determine the geo-location of an authorized user who is exiting the home, and may determine that one or more users are still located in the home according to geo-location data, and the controller 73 may refrain from arming the alarm device 76 to allow for the one or more users still in the home to exit. In yet another example, the sensors 71, 72 may determine the geo-location of an authorized user who has exited the home, and determine that one or more users are still located within the home, and the controller 73 may automatically arm the alarm device 76 to activate an audio and/or visual alarm when a defined outer perimeter is breached by an unauthorized user or when a door leading outside of the home is opened, but may not activate the alarm when doors internal to the home are opened or closed.

In some embodiments, when an alert communication has been received by the security system, the alarm device 76 disarmed by the controller 73 according to a PIN, a security code, and/or other access information provided by the device 75.

In some embodiments, the alarm device 76 can be armed or disarmed when the controller 73 determines that the device 75 and/or sensors 71, 72 are disconnected from the communications network 70 coupled to the alarm device 76. For example, if device 75 and/or sensors 71, 72 are disconnected from the network 70 so as to be decoupled from the controller 73 and/or remote system 74, the controller 73 may arm the alarm device 76. That is, the network 70 may be a wireless network having a predetermined communicative range within and/or around the perimeter of a house or building. When an authorized device 75 becomes decoupled from the network 70 (e.g., because the device 75 is outside of the predetermined communicative range) and/or the sensors 71, 72 become decoupled from the network 70, the controller 73 may automatically arm the alarm device 76.

In the security system disclosed herein, sensors 71, 72 can detect a security event, such as a door event (e.g., where a door to a house is opened, closed, and/or compromised) or a window event (e.g., where a window of a house is opened, closed, and/or compromised). For example, the sensors 71, 72 may have an accelerometer that identifies the force on the door or window as a compromising event. In another example, the sensors 71, 72 may contain an accelerometer and/or compass, and the compromising event may dislodge the sensor from the door or window, and the motion of the sensor 71, 72 may identify the motion as a compromising event. The controller 73 may activate the alarm device 76 according to whether the detected door event or window event is from an outside location (e.g., outside the house, building, or the like). That is, the controller 73 may control the alarm device 76 to output an audible alarm and/or message via a speaker when a door event or window event is detected by the sensors 71, 72. A light of the alarm device 76 may be activated so as to be turned on when one or more sensors 71, 72 detect a security event, such as a door or window event. Alternatively, or in addition, a light may be turned on and off in a pattern (e.g., where the light is turned on for one second, and off for one second; where the light is turned on for two seconds, and off for one second, and the like) when one or more sensors 71, 72 detect a security event such as the window and/or door event.

The controller 73 can control the alarm device 76 to be armed or disarmed according to a preset time period for a user to enter or exit a home or building associated with the security system. The predetermined time can be adjusted by the controller 73 and/or according to the user. For example, as discussed herein, the controller 73 can aggregate data from the sensors 71, 72 to determine when a user enters and exits the home (e.g., the days and times for entry and exit, the doors associated with the entry and exit, and the like). For example, the controller 73 can adjust the amount of time for arming the alarm device 76 to be longer or shorter, according to the amount of time the user takes to exit the house according to the aggregated data. In some embodiments, when an alert communication is received by the security system, the controller 73 may reduce the preset time allotted for a user to enter a home.

In the security system disclosed herein the at least one sensor determines that the user is not occupying the home or building, and/or is outside of the predetermined area for a time greater than a preset time, the controller 73 can control the alarm device 76 to transition from a first security mode to a second security mode. The second security mode may provide a higher level of security than the first security mode. For example, the second security mode may be a "vacation" mode, where the user of the security system disclosed herein (e.g., the members of a household) are away from the house for a period of time (e.g., 1 day, 3 days, 5 days, 1 week, 2 weeks, 1 month, or the like). As discussed herein, the controller 73 may aggregate the detection data received from the sensors 71, 72 over a preset time (e.g., 1 week, 1 month, 6 months, 1 year, or the like) to determine a pattern for when the user is within the predetermined location or not. In some embodiments, the controller 73 may control the alarm device 76 to transition from the first security mode to the second security mode when an alert communication is received by the security system. That is, the security system may provide a higher level of security in the second mode when the alert communication is received.

Figure 4:
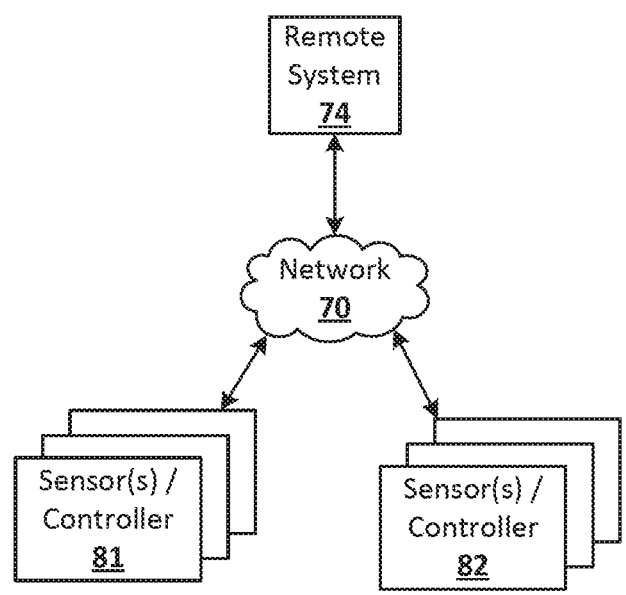
FIG. 4 shows a remote system to aggregate data from multiple locations having security systems according to an embodiment of the disclosed subject matter.

In some configurations, as illustrated in FIG. 4, a remote system 74 may aggregate data from multiple locations, such as multiple buildings, multi-resident buildings, and individual residences within a neighborhood, multiple neighborhoods, and the like. In some embodiments, the remote system 74 in FIG. 4 may be different from the law enforcement communication system, the security service provider system, the neighborhood alert communication system, and/or the social network communication system of the remote system 74 shown in FIGS. 2A-2B. In general, multiple sensor/controller systems 81, 82 as previously described with respect to FIGS. 2A-2B may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

For example, remote system 74 may gather and/or aggregate security event and/or environmental event data from systems 81, 82, which may be geographically proximally located to the security system illustrated in FIGS. 2A-2B. The systems 81, 82 may be located within one-half mile, one mile, five miles, ten miles, 20 miles, 50 miles, or any other suitable distance from the security system of a user, such as the security system shown in FIGS. 2A-2B. The remote system 74 may provide at least a portion of the gathered and/or aggregated data to the controller 73 and/or the device 75 illustrated in FIG. 2B. In some embodiments, the remote system 74 may gather and/or aggregate alert communications and provide them to systems 81, 82.

The user of the device 75 may receive information from the controller 73 and/or the remote system 74 regarding a security event that is geographically proximally located to the user of the device 75 and/or the security system of a building (e.g., a home, office, or the like) associated with the user. Alternatively, or in addition, an application executed by the device 75 may provide a display of information from systems 81, 82, and/or from the remote system 74.

For example, an unauthorized entry to a building associated with systems 81, 82 may occur, where the building is within one-half mile from the building associated with the user of the device 75. The controller 73 and/or the remote system 74 may transmit a message (e.g., a security alert message) to the device 75 that an unauthorized entry has occurred in a nearby building, thus alerting the user to security concerns and/or potential security threats regarding their geographically proximally located building. In some embodiments, the remote system 74 may transmit an alert communication to a user device that an unauthorized entry has occurred in the area.

In another example, a smoke and/or fire event of a building associated with systems 81, 82 may occur, where the building is within 500 feet from the building associated with the user of the device 75. The controller 73 and/or the remote system 74 may transmit a message (e.g., a hazard alert message, an alert communication message) to the device 75 that the smoke and/or fire event has occurred in a nearby building, thus alerting the user to safety concerns, as well as potential smoke and/or fire damage to their geographically proximally located building.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 5:
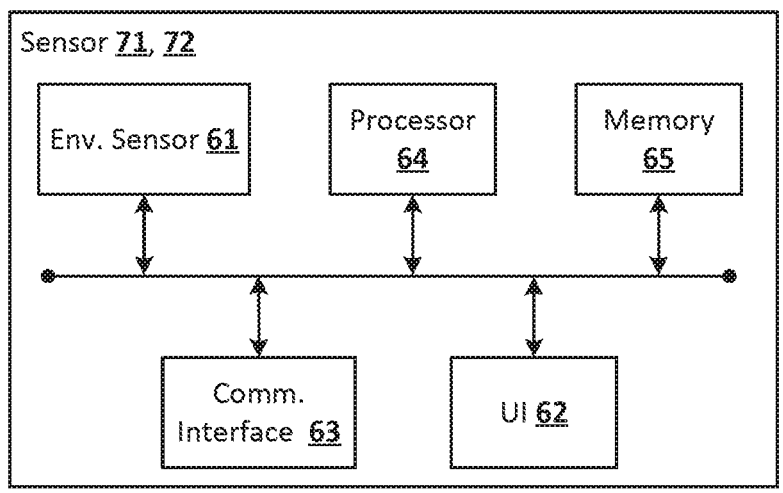
FIG. 5 shows an example sensor according to an embodiment of the disclosed subject matter.

FIG. 5 shows an example sensor that may be used in one or more of the embodiments shown in FIGS. 2A, 2B, and 3. As shown in FIG. 5, the sensor may include hardware in addition to the specific physical sensor that obtains information about the environment.

A sensor, as used throughout, may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

The sensor (e.g., sensor 71, 72 shown in FIGS. 2A-2B, 4, and 5) of the security system may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

FIG. 5 shows an example sensor as disclosed herein. The sensor 71, 72 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 71, 72 is located. A processor 64 may receive and analyze data obtained by the sensor 61, control operation of other components of the sensor 71, 72, and process communication between the sensor and other devices. The processor 64 may execute instructions stored on a computer-readable memory 65. The memory 65 or another memory in the sensor 71, 72 may also store environmental data obtained by the sensor 61. A communication interface 63, such as a Wi-Fi or other wireless interface, Ethernet or other local network interface, or the like may allow for communication by the sensor 71, 72 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 71, 72. The speaker may output a message to an authorized user regarding the operational status (e.g., there are no security and/or environmental events, an operational issue has been detected, and/or a security event and/or environmental event has been detected) of the security system disclosed herein, when, for example, the user arrives at the building (e.g., the user's home, the user's office, or the like), or when the user exits the building. The speaker may output an audible message for a user to access information regarding the operational status of the security system, for example, when the user arrives at the building (e.g., a home, an office, or the like) via an application installed and/or accessible from an electronic device (e.g., device 75 illustrated in FIG. 2B and/or FIG. 6). Alternatively, or in addition, the UI 62 may include a light to be activated when an event is detected by the sensor 71, 72. The user interface may be relatively minimal, such as a limited-output display, or it may be a full-featured interface such as a touchscreen.

Components within the sensor 71, 72 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Faults and/or other issues with sensors may be reported to the central controller. If the communications network that the sensors and the central controller are part of experiences connectivity issues, data to authenticate users so as to allow entry, and/or arming and/or disarming of the security system may be stored at individual sensors that may serve as access points to the home and/or building. Alternatively or in addition, a central controller as disclosed herein may be remote from the sensors, such as where the central controller is implemented as a cloud-based system that communicates with multiple sensors, which may be located at multiple locations and may be local or remote with respect to one another.

Embodiments of the presently disclosed subject matter may be implemented in and used with a variety of computing devices. FIG. 6 is an example computing device 75 suitable for implementing embodiments of the presently disclosed subject matter (e.g., the device 75 shown in FIG. 2B). The device 75 may be used to implement a controller, a device including sensors as disclosed herein, or the like. Alternatively or in addition, the device 75 may be, for example, a desktop or laptop computer, or a mobile computing device such as a smart phone, smart watch, wearable computing device, tablet, key FOB, RFID tag, fitness band or sensor, or the like. The device 75 may include a bus 21 which interconnects major components of the device 75, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the device 75 are generally stored on and accessed via a computer readable storage medium.

The fixed storage 23 may be integral with the device 75 or may be separate and accessed through other interfaces. The network interface 29 may provide a direct connection to a remote server via a wired or wireless connection. The network interface 29 may provide a communications link with the network 70, sensors 71, 72, controller 73, and/or the remote system 74 as illustrated in FIGS. 2A-2B. The network interface 29 may provide such connection using any suitable technique and protocol as will be readily understood by one of skill in the art, including digital cellular telephone, radio frequency (RF), Wi-Fi, Bluetooth®, Bluetooth Low Energy (BTLE), near-field communications (NFC), and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, at a security system, a communication for a predetermined geographic area from a system that is operated separately from the security system and is unrelated to a security provider, wherein the communication results from a condition within or near the predetermined geographic area;
   wherein the communication is received from at least one of the group consisting of: a law enforcement communication system, a neighborhood alert communication system, a weather-related communications system, and a social network communication system;
   automatically reducing at the security system, a time period of an entry allowance setting of the security system of a premises in response to determining that a user is away from the premises and based on the received communication; and
   further comprising: receiving a selection to accept the changing of the entry allowance setting from a preselected mobile device in response to the communication.

2. The method of claim 1, further comprising: transmitting a message to a designated emergency contact via a communications interface of the security system.

3. The method of claim 1, further comprising:
   transmitting at least one of an image and a video stream captured from an image sensor of the security system to at least a preselected mobile device.

4. The method of claim 1, further comprising:
disarming the security system when at least one from the group consisting of a PIN, a security code, and transmitted security authorization information is received by the security system.

5. The method of claim 1, further comprising:
updating the changed entry allowance setting in response to at least one from the group consisting of: an updated communication, a received selection from a pre-selected mobile device, and a selection received from a user interface of the security system.

6. The method of claim 1, further comprising: adjusting the sensitivity of at least one sensor of the security system according to a type of the received communication.

7. The method of claim 1, further comprising:
analyzing the communication to determine an alert type; and
changing the entry allowance setting of the security system according to the determined alert type.

8. A security system comprising:
a communications interface to receive a communication for a predetermined geographic area from a system that is operated separately from the security system and is unrelated to a security provider that results from a condition within or near the predetermined geographic area;
wherein the communications interface receives at least one of the communication from at least one of the group consisting of: a law enforcement communication system, a neighborhood alert communication system, a weather-related communications system, and a social network communication system;
a processor to automatically reduce a time period of an entry allowance setting of the security system in a memory coupled to the processor in response to determining that a user is away from the premises and based on the received communication; and
wherein the communications interface receives a selection to accept the changing of the entry allowance setting from a pre-selected mobile device in response to the received communication.

9. The system of claim 8, wherein the communications interface transmits a message to a designated emergency contact with the communications interface of the security system.

10. The system of claim 8, wherein when the entry allowance setting is changed by the processor, the communications interface transmits at least one of an image and a video stream captured from an image sensor of the security system to at least a preselected mobile device.

11. The system of claim 8, wherein when the entry allowance setting is changed, the processor disarms the security system when at least one from the group consisting of a PIN, a security code, and transmitted security authorization information is received by the processor.

12. The system of claim 8, wherein the processor updates the changed entry allowance setting in response to at least one from the group consisting of: an updated communication, a received selection from a pre-selected mobile device, and a selection received from a user interface of the security system.

13. The system of claim 8, wherein the processor adjusts the sensitivity of at least one sensor of the security system according to a type of the received communication.

14. The system of claim 8, wherein the processor analyzes the communication to determine an alert type, and changes the entry allowance setting of the security system according to the determined alert type.

* * * * *